US012593825B2

(12) United States Patent
Spruill

(10) Patent No.: US 12,593,825 B2
(45) Date of Patent: Apr. 7, 2026

(54) ANIMAL SCRATCHING PAD AND AMUSEMENT DEVICE

(71) Applicant: Arnold Spruill, Monroe, NY (US)

(72) Inventor: Arnold Spruill, Monroe, NY (US)

( * ) Notice: Subject to any disclaimer, the term of this patent is extended or adjusted under 35 U.S.C. 154(b) by 0 days.

(21) Appl. No.: 18/955,298

(22) Filed: Nov. 21, 2024

(65) Prior Publication Data

US 2025/0160299 A1 May 22, 2025

Related U.S. Application Data

(60) Provisional application No. 63/601,318, filed on Nov. 21, 2023.

(51) Int. Cl.
*A01K 15/00* (2006.01)
*A01K 15/02* (2006.01)

(52) U.S. Cl.
CPC .......... *A01K 15/024* (2013.01); *A01K 15/025* (2013.01)

(58) Field of Classification Search
CPC .... A01K 15/024; A01K 15/025; A01K 15/02; A01K 15/027; A63B 2208/14; A63B 22/18
See application file for complete search history.

(56) References Cited

U.S. PATENT DOCUMENTS

| | | | | |
|---|---|---|---|---|
| 5,579,725 A | * | 12/1996 | Boshears ............. | A01K 15/025 119/706 |
| 5,673,651 A | * | 10/1997 | Udelle ................. | A01K 15/025 119/706 |
| 5,680,831 A | * | 10/1997 | Udelle ................. | A01K 13/004 119/609 |
| 5,785,005 A | * | 7/1998 | Udelle ................. | A01K 15/025 119/706 |
| 5,881,679 A | * | 3/1999 | Hann ................... | A01K 15/025 119/707 |
| D606,713 S | * | 12/2009 | Kellogg ........................ | D30/160 |
| D633,661 S | * | 3/2011 | Kellogg ........................ | D30/160 |
| 9,591,832 B2 | * | 3/2017 | Price .................... | A01K 15/024 |
| 2009/0095229 A1 | * | 4/2009 | Plante ................. | A01K 15/025 119/707 |
| 2010/0058994 A1 | * | 3/2010 | Siklosi ................ | A01K 15/025 119/707 |

(Continued)

*Primary Examiner* — Trinh T Nguyen
(74) *Attorney, Agent, or Firm* — Cynthia S. Lamon; Lamon Patent Services

(57) ABSTRACT

An animal scratching pad and amusement device includes a toy body with an open-topped continuous half-pipe track disposed around the periphery of the body. A ball is movable within the track, rolling freely while being secured against dislodgement by an animal. The toy body features a recessed reception area on the top surface thereof, configured to receive a removable scratchpad for scratching activities. The device incorporates modular components, including a flat bottom extended height insert block that elevates the rear end of the toy body, creating an inclined track to enhance the rolling motion of the ball. Alternatively, a rocking motion insert block can be attached to the bottom surface, providing a dynamic side-to-side or to-and-fro rocking movement for added interactivity. The toy body is constructed from durable, food-grade materials and is adaptable in shape.

14 Claims, 8 Drawing Sheets

(56)          References Cited

U.S. PATENT DOCUMENTS

| | | | |
|---|---|---|---|
| 2012/0192806 A1* | 8/2012 | Dixon | .................. A01K 15/025 |
| | | | 119/707 |
| 2016/0242388 A1* | 8/2016 | Chiou | .................. A01K 15/025 |
| 2019/0239481 A1* | 8/2019 | Bentz | .................. A01K 15/025 |

* cited by examiner

ANIMAL SCRATCHING PAD AND
AMUSEMENT DEVICE

CROSS-REFERENCE TO RELATED
DOCUMENTS

The present invention claims priority to a U.S. provisional patent application titled Half Pipe Express Ser. No. 63/601, 318 filed on Nov. 21, 2023, disclosure of which is included herein at least by reference.

TECHNICAL FIELD

The present disclosure relates to amusement devices for pets and more particularly, to an interactive roller ball amusement device with enhanced features to engage pets, such as cats, through dynamic ball motion, elevated configurations, and multi-functional components.

BACKGROUND OF INVENTION

The following description includes information that may be useful in understanding the present disclosure. It is not an admission that any of the information provided herein is prior art or relevant to the present disclosure, or that any publication specifically or implicitly referenced is prior art.

Pet toys designed to entertain and stimulate animals often feature rolling ball mechanisms within tracks or pipes. Such pet toys include various circular and curved track designs, are placed flat on the ground and allow a ball to move within the track, providing visual and tactile stimulation for the animal. However, conventional designs frequently fail to maintain prolonged engagement, as the static and predictable motion of the ball often leads to reduced interest over time.

Attempts to enhance such toys have been limited to variations in track design and material composition, but these have not sufficiently addressed the need for increased interactivity.

A need exists for an improved pet amusement device that overcomes the limitations of conventional pet toys by incorporating features such as inclined tracks for increased ball motion, rocking mechanisms for unpredictable movement, and additional elements to create visual and tactile stimulation.

SUMMARY OF INVENTION

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In an aspect, the present disclosure relates to an animal scratching pad and amusement device designed to engage and entertain pets while providing scratching functionality. The device comprises a toy body with an open-topped continuous half-pipe track disposed around its periphery. A ball is movable within the track and is configured to roll freely while being secured against dislodgement by an animal. A recessed reception area is formed on the top surface of the toy body, designed to receive and securely accommodate a removable scratchpad. The toy body also includes a flat bottom extended height insert block attachable to its bottom surface, allowing the rear end of the toy body to be elevated, thereby inclining the track to enhance the rolling motion of the ball.

In an exemplary embodiment, the continuous half-pipe track can be circular and surround the scratchpad and receptacle. The flat bottom extended height insert block is designed with a base to provide stable support, preventing lateral movement of the device on flat surfaces. The bottom surface of the toy body features attachment points that can receive interlocking height blocks or rocking motion insert blocks, where the height blocks elevate the rear end of the toy body and the rocking motion insert blocks provide a rocking motion to enhance the play experience.

In an exemplary embodiment, the flat bottom extended height insert block includes one or more protrusions that engage with corresponding attachment points on the toy body, ensuring secure attachment. Additionally, the invention includes an embodiment where a rocking motion insert block is attachable to the bottom surface of the toy body. The rocking motion insert block elevates the rear end of the toy body and creates a side-to-side or to-and-fro motion, enhancing the interactive play experience. The rocking motion insert block is designed with protrusions to engage the attachment points on the bottom surface of the toy body.

The device can also feature a slip-on bag that partially or fully encloses the toy body. The bag includes an elastic opening or drawstring for secure attachment and is made from materials such as medium- to heavy-gauge plastic, crinkle plastic with or without natural fibers, or eco-friendly fabrics like cotton, jute, hemp, or burlap. The ball within the track is constructed from materials such as resins, phenolic resins, polyester resins, plastic, or glass, ensuring sufficient mass to maintain inertia during motion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which.

Figure 1:
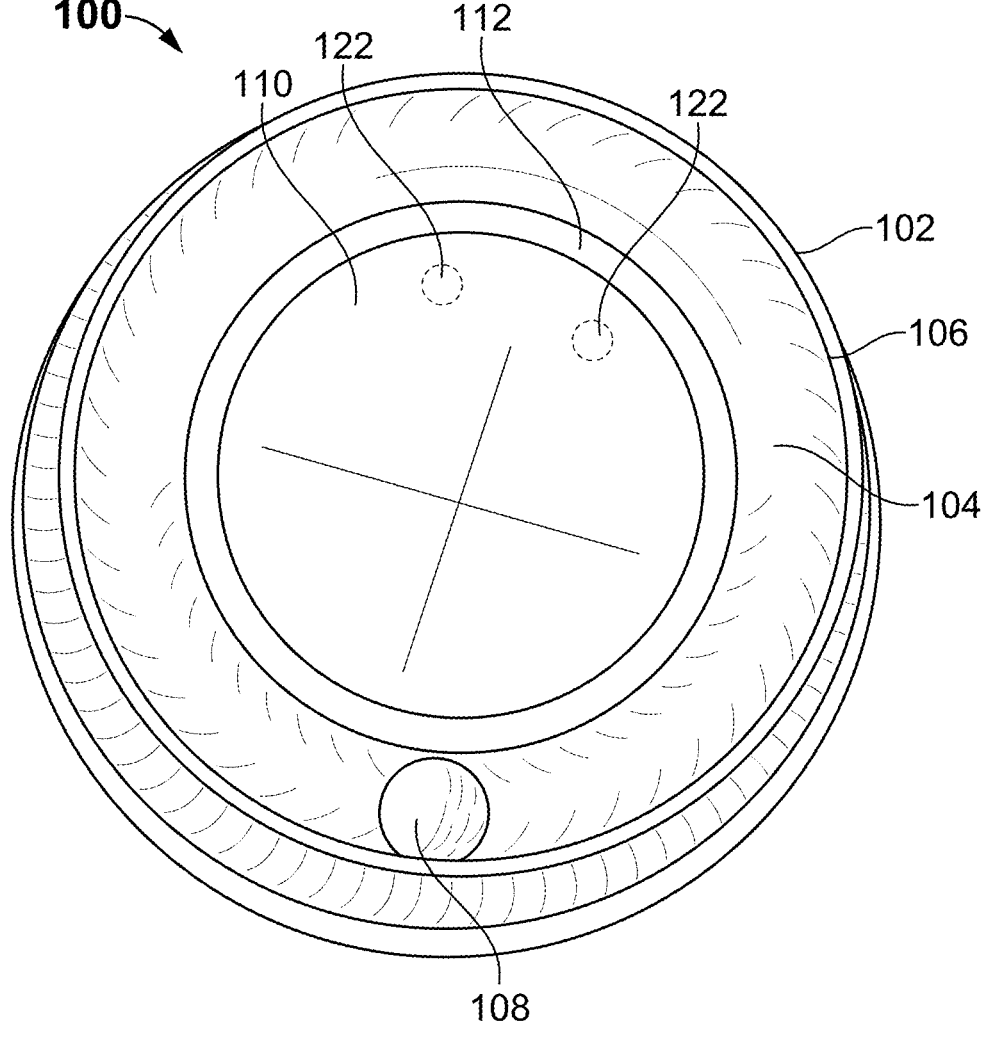
FIG. 1 illustrates a top view of one embodiment of an interactive rollerball animal amusement device 100 of the present invention.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprise", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Reference will now be made to the exemplary embodiments of the disclosure, as illustrated in the accompanying drawings. Wherever possible, same numerals will be used to refer to the same or like parts. Embodiments of the disclosure are described in the following paragraphs with reference to FIG. 1-FIG. 13.

Although the majority of the figure drawings depict an interactive rollerball animal amusement device 100 designed primarily for household pets such as cats, the present disclosure contemplates adaptations for a broader range of animals and environments. While the device is detailed here in its most common use as a compact, interactive pet toy, it is envisioned that larger versions or modified configurations could be employed for other domestic or exotic animals, such as ferrets or otters, or even for use in specialized settings like pet rehabilitation or enrichment centers. These alternative implementations may retain the same or similar structural components and features, such as the inclined half-pipe track, replaceable corrugated inserts, and optional height adjustment mechanisms, as described herein.

FIG. 1 illustrates a top view of one embodiment of an animal scratching pad and amusement device 100 of the present invention. The interactive rollerball animal amusement device 100 includes a circular body 102 which is made of a waterproof, food-grade, corrosion-resistant, and durable material such as a biodegradable plastic. The circular toy body 102 includes a continuous channel or half pipe track 104 disposed around the periphery 106 of the circular toy body 102.

A roller ball 108 adapted to move along the channel 104 is contained within the channel 104. The channel 104 is designed such that the ball 108 easily moves along the channel 104. The ball 108 is lightweight and in use, when the ball 108 is pushed by an animal such as a cat, the ball 108 rolls within the channel 104 for an additional distance. In the preferred embodiment, the ball 108 can be made of, but not limited to, a material such as resins, phenolic resins, polyester resins, plastic, glass or another durable material wherein the ball 108 rolls freely in the half pipe track 104. The channel 104 and the ball 108 are designed such that a person can place the ball 108 into and out of the track 104, however, an animal such as a cat cannot dislodge the ball 108 from the half pipe track 104. The ball 108 is designed to freely roll within the half-pipe track 104 and has sufficient mass which ensures sustained inertia during motion. The ball 108 and the track 104 design prevents pets, such as cats, from dislodging the ball 108 while allowing easy placement or removal by users. Motion of the ball 108 remains smooth and continuous, even when the device 100 is in an elevated or inclined configuration.

A circular recessed reception area 110 is disposed on the top surface 112 of the body 102. The circular recessed reception area 110 is configured to receive and accommodate a corrugated insert 114 which is used for scratching by a pet animal.

Figure 2:
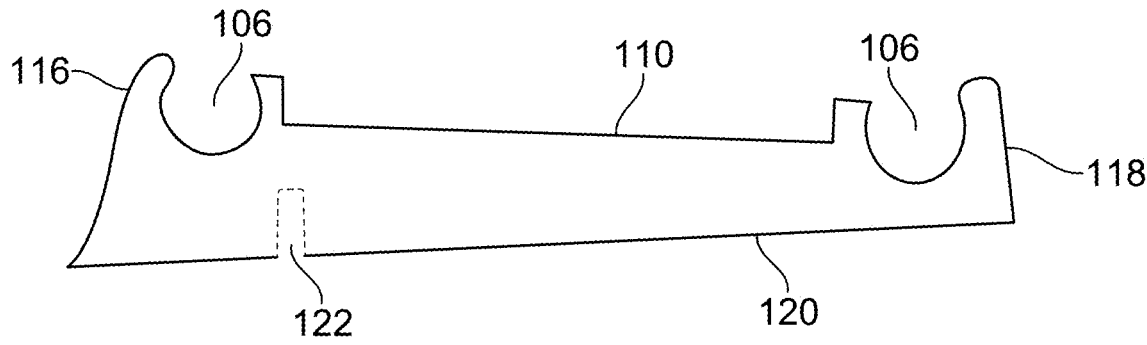
FIG. 2 illustrates a cross-sectional view of the interactive rollerball animal amusement device 100 of FIG. 1 in accordance with one embodiment of the present invention.

FIG. 2 illustrates a cross-sectional view of the interactive rollerball animal amusement device 100 of FIG. 1 in accordance with one embodiment of the present invention. As illustrated, the rear end 116 of the toy body 102 is elevated relative to the front end 118 of the toy body 102. The elevated rear end 116 allows the roller ball 108 to easily roll along the channel 104 from the rear end 116 towards the front end 118.

Figure 3:
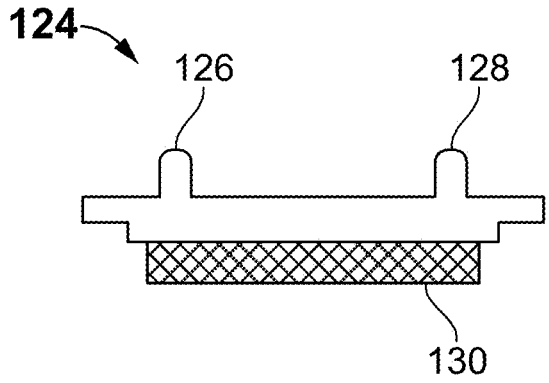
FIG. 3 illustrates an isolated view of flat bottom extended height insert block used for extending the elevation of rear end of the interactive rollerball animal amusement device 100.
Figure 4:
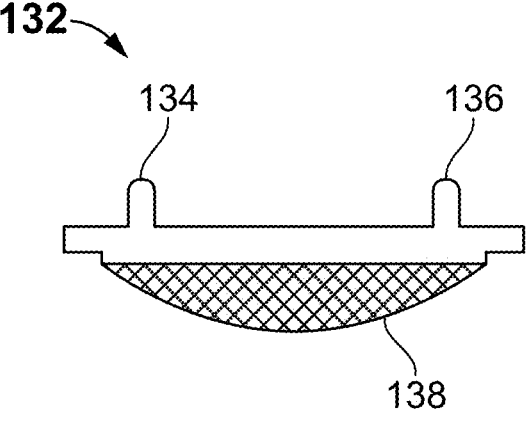
FIG. 4 illustrates an isolated view of rocking motion extended height insert block used for extending the elevation of rear end of the interactive rollerball animal amusement device 100.

Bottom surface 120 of the toy body 102 includes at least one half-pipe height block attachment point 122 which is adapted to receive and accommodate interlocking height blocks as illustrated in FIGS. 3 and 4.

Referring now to FIG. 3, an isolated view of flat bottom extended height insert block used for extending the elevation of rear end of the interactive rollerball animal amusement device 100 is disclosed. The flat bottom extended height insert block 124 is used for elevating the rear end 116 of the toy body 102 and is adapted to inserted into the half-pipe height block attachment points 122 of the toy body 102.

Figure 5:
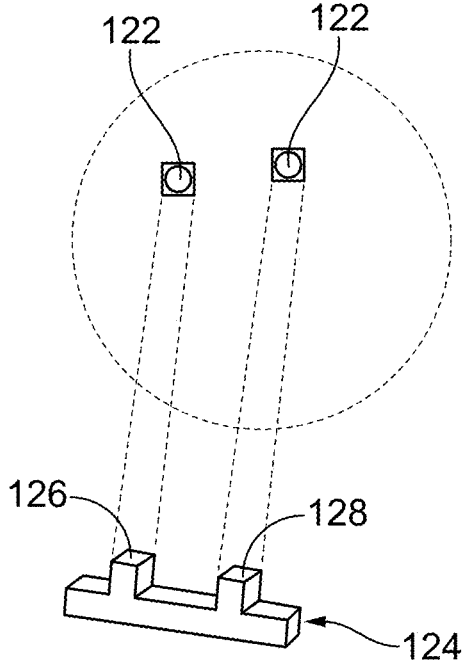
FIG. 5 illustrates a perspective view of connection of the flat bottom extended height insert block and the half-pipe height block attachment points.

Referring now to FIG. 5, more specifically, the protrusions 126,128 of the flat bottom extended height insert block 124 are inserted into the half-pipe height block attachment points 122, thereby elevating the rear end 116 of the toy body 102. The flat bottom member 130 provides a stable support to the toy body 102 and prevents any lateral movement on any type of surface.

Referring now to FIG. 4, an isolated view of rocking motion extended height insert block used for extending the elevation of rear end of the interactive rollerball animal amusement device 100 is disclosed. For providing a rocking motion in addition to elevating the rear end 116 of the toy body 102, the rocking motion extended height insert block 132 is used and the protrusions 134,136 are inserted into the half-pipe height block attachment points 122, thereby elevating the rear end 116 of the toy body 102. The oval or round bottom member 138 provides a rocking motion to the toy body 102 for enhancing functionality of the animal scratching pad and amusement device 100.

Figure 6:
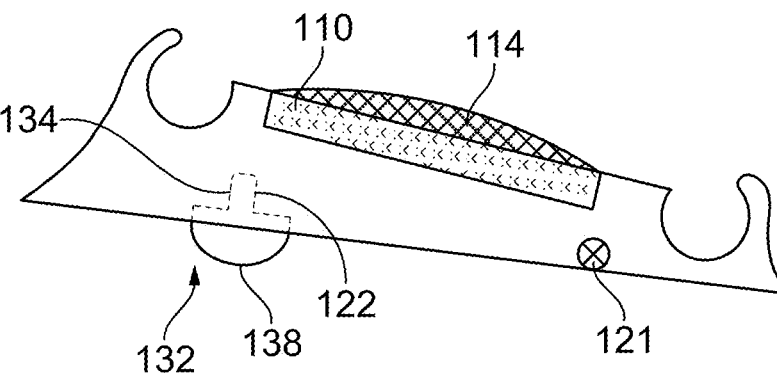
FIG. 6 illustrates a cross-cut view of the interactive rollerball animal amusement device 100 showing use of the rocking motion extended height insert block 132 with the toy body for elevating the rear end thereof.

FIG. 6 illustrates a cross-cut view of the interactive rollerball animal amusement device 100 showing use of the rocking motion extended height insert block 132 with the toy body for elevating the rear end thereof. As illustrated, the protrusion 134 is inserted into the half-pipe height block attachment point 122, thus elevating the rear end 116 while the bottom member 138 provides the rocking motion. It should be noted that during rocking movement of the toy body 102, the corrugated insert 114 remains securely accommodated in the circular recessed reception area 110. As described in FIGS. 10 and 11, a slip-on bag 140 is used with the device 100 and can be detachably attached using the attachment point 121 which can be a mechanical fastener, magnetic fastener, adhesive, or any other attachment means.

Figure 7:
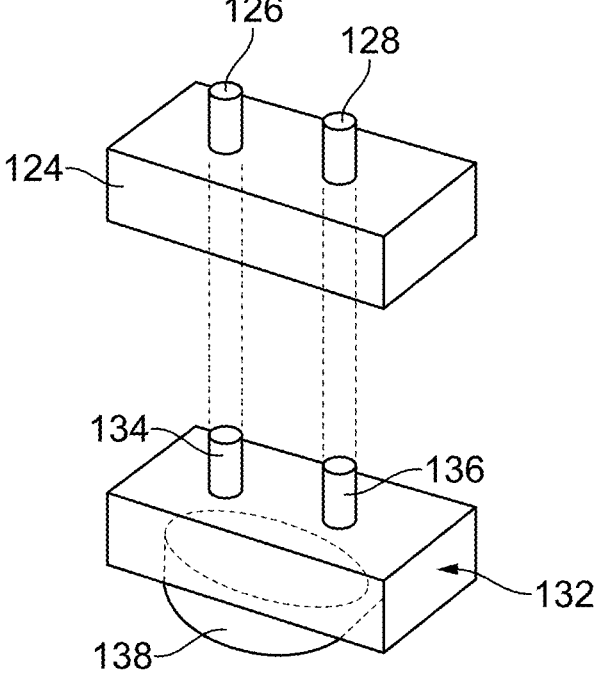
FIG. 7 illustrates a perspective view showing use of both the flat bottom extended height insert block 124 and the rocking motion extended height insert block 132 together in accordance with one embodiment of the present invention.

FIG. 7 illustrates a perspective view showing use of both the flat bottom extended height insert block 124 and the rocking motion extended height insert block 132 together in accordance with one embodiment of the present invention. As illustrated, the rocking motion extended height insert block 132 is placed under the flat bottom extended height insert block 124 such that the protrusions 134, 136 are accommodated and supported by the flat bottom member 130 and are aligned with the protrusions 126, 128.

Figure 8:
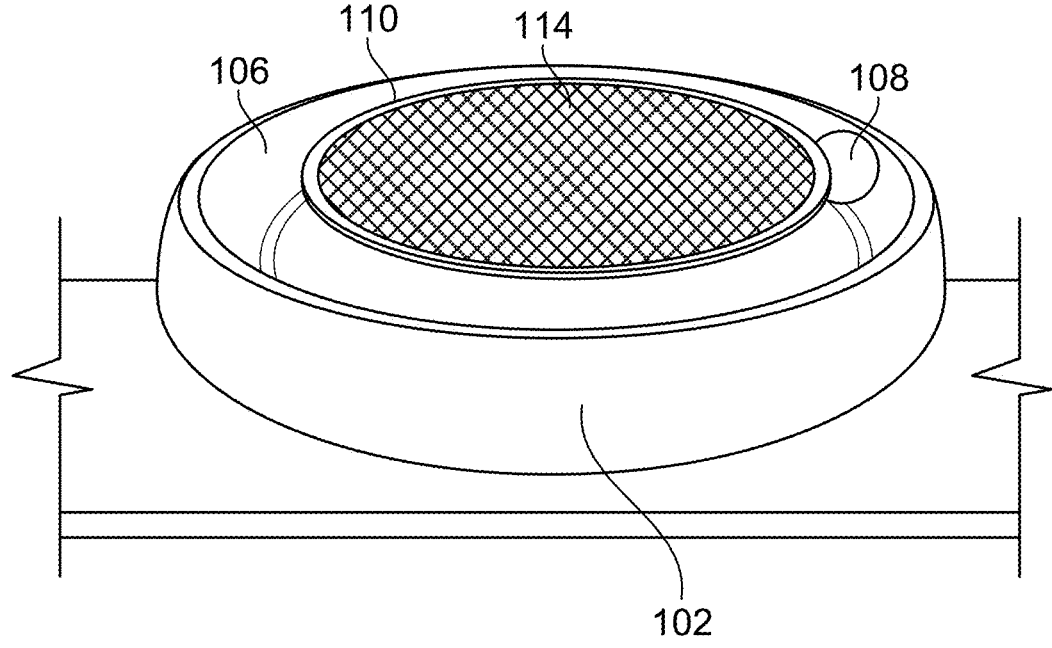
FIG. 8 illustrates the device in an elevated or inclined state being placed on a surface, in accordance with one embodiment of the present invention.

Referring now to FIG. 8, the animal scratching pad and amusement device 100 has the elevated rear end 116 when placed on a surface. As illustrated, the flat bottom extended height insert block 124 is used in the present embodiment for elevating the rear end 116. The corrugated insert 114 is easily accessible to a pet, thereby preventing surrounding furniture from damage.

Figure 9:
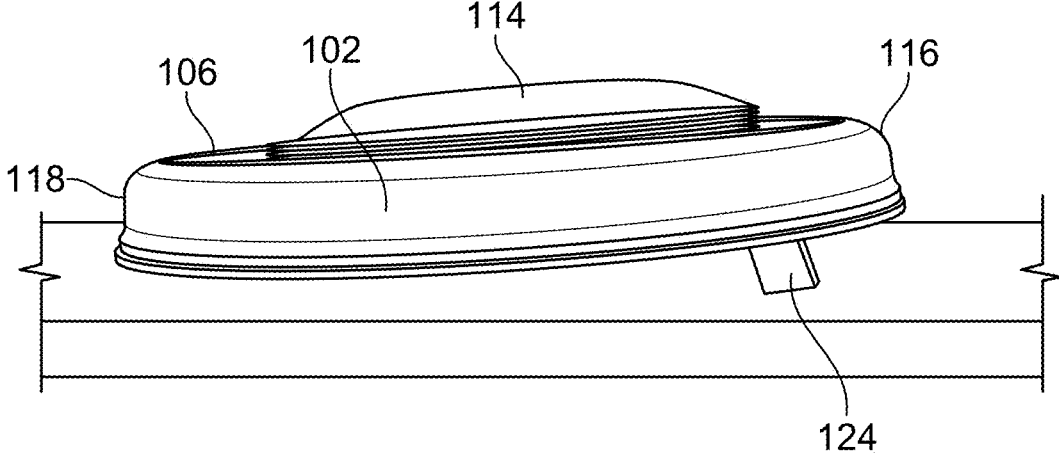
FIG. 9 illustrates the interactive rollerball animal amusement device 100 in a flat position and placed on a surface in accordance with one embodiment of the present invention.

FIG. 9 illustrates the interactive rollerball animal amusement device 100 in a flat position and placed on a surface in accordance with one embodiment of the present invention. In the present embodiment, the flat bottom extended height insert block 124 and the rocking motion extended height insert block 132 are not used with the half-pipe height block attachment points 122 of the toy body 102 and thus, the bottom surface 120 of the toy body 102 adheres to the surface. It should be noted that the interactive rollerball animal amusement device 100 can be used in both an inclined position as illustrated in FIG. 8 and the flat position as illustrated in FIG. 9.

Figures 10, 11:
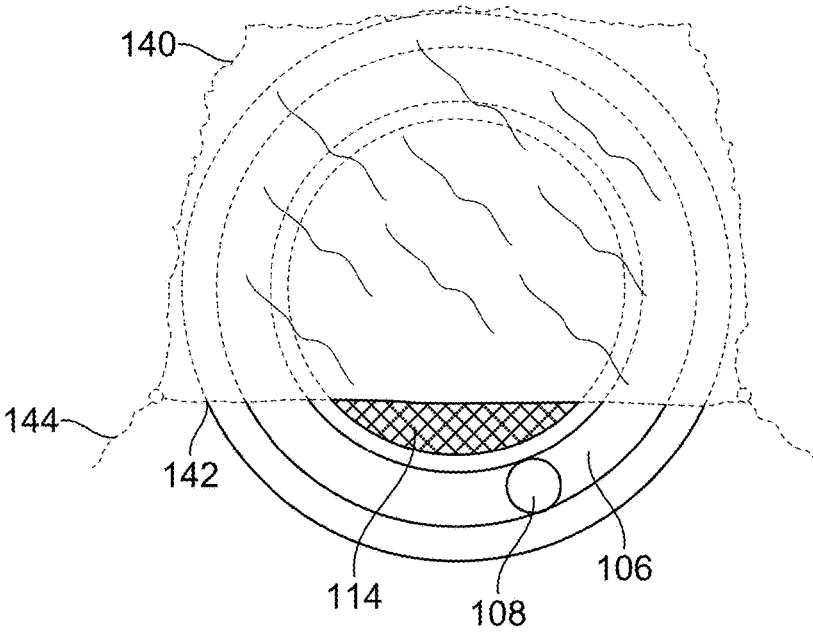
FIGS. 10 and 11 illustrate the interactive rollerball animal amusement device 100 partially covered by a slip-on bag for enhancing play by a pet in accordance with one embodiment of the present invention.

FIG. 10 illustrates the interactive rollerball animal amusement device 100 partially covered by a slip-on bag for enhancing play by a pet in accordance with one embodiment of the present invention. A removably attached slip-on bag 140 is included with the device 100 as an accessory and a safety device for preventing the device 100 from physical damage, scratches, and more. The slip-on bag 140 includes an elastic opening 142 and a drawstring 144 to completely enclose the toy body 102 therein. The bag 140 can slip-on the toy body 102 to cover at least a portion of the half pipe track 104. The area of the device 100 enclosed by the bag 140 is not visible to a pet and therefore, enhances the play when the ball 108 is visible to the pet and rolls along the portion 146 of the half pipe track 104 which is not enclosed by the slip-on bag 140. As illustrated in FIG. 11, the corrugated insert 114 is also enclosed by the slip-on bag 140 and a portion of the half pipe track 104 is accessible for accessing and playing with the rolling ball 108.

Figure 12:
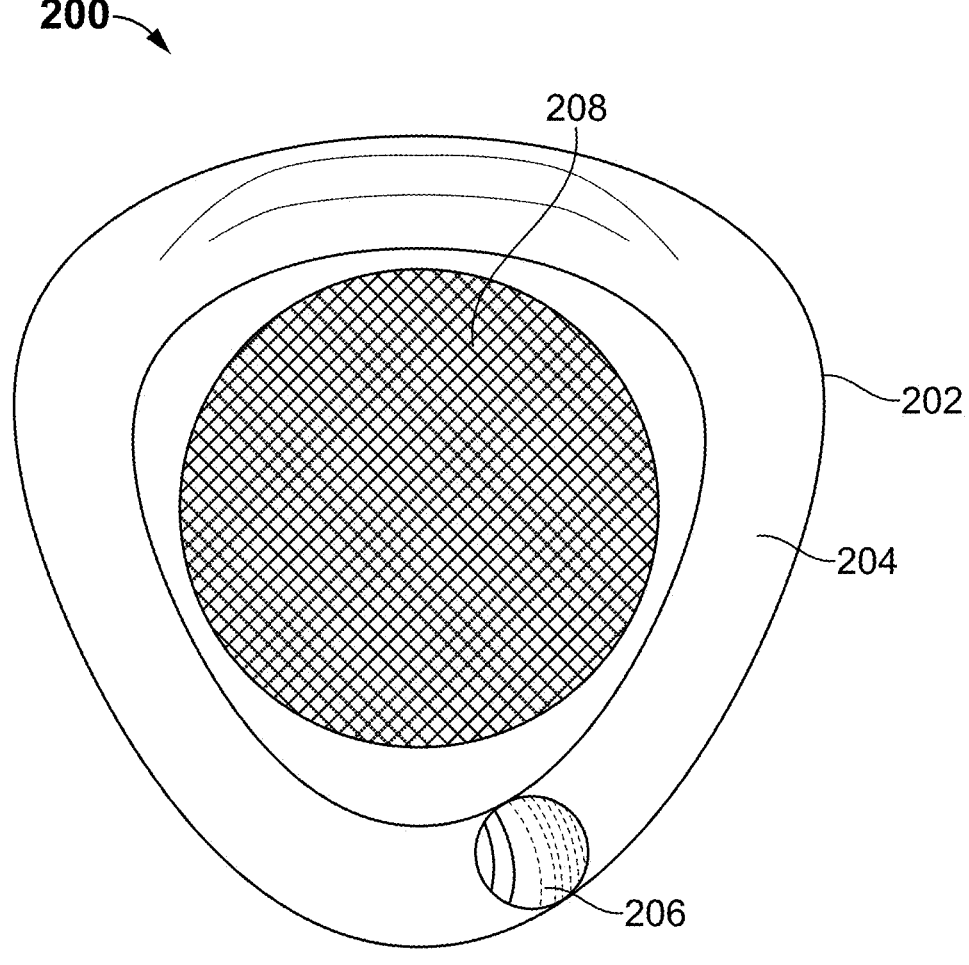
FIG. 12 illustrates a top view of another embodiment of the interactive rollerball animal amusement device of the present invention in accordance with the disclosed structure.

FIG. 12 illustrates a top view of another embodiment of the interactive rollerball animal amusement device of the present invention in accordance with the disclosed structure. In the present embodiment, the device 200 includes a tri-oval shaped body 202 and has a tri-oval half pipe track 204 for accommodating and allowing rolling of a rolling ball 206 along the length thereof. A corrugated insert 208 which can be flat, domed, convex, or any other shape is disposed at the center of the toy body 202. The corrugated insert 208 is removably placed and can be replaced with a new insert as per preferences of users.

Figure 13:
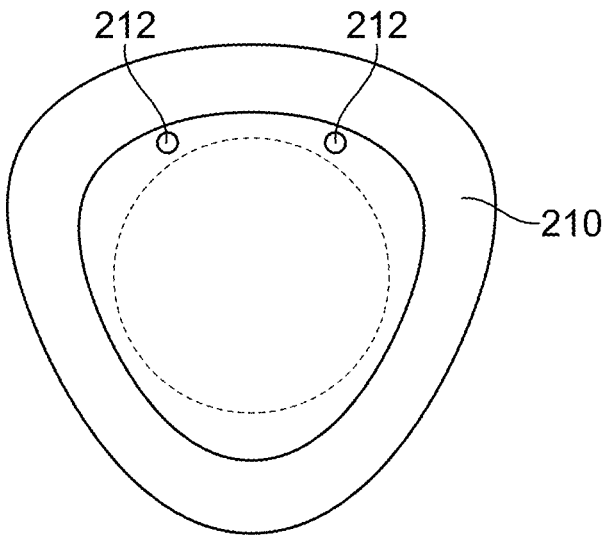
FIG. 13 illustrates a bottom view of another embodiment of the interactive rollerball animal amusement device of the present invention in accordance with the disclosed structure.

Referring now to FIG. 13, the bottom surface 210 of the toy body 202 includes a pair of half-pipe height block attachment points 212 for receiving the flat bottom extended height insert block 124 or the rocking motion extended height insert block 132 as described earlier in the disclosure for elevating the rear end 214 of the toy body 202.

The slip-on bag 140 may be manufactured from materials like medium- to heavy-gauge plastic, crinkle plastic with or without natural fibers, or eco-friendly fabrics such as cotton, jute, hemp, or burlap. When used with the slip-on bag, the corrugated insert of different embodiments adds a layer of tactile stimulation, combining play and scratching activities into a cohesive design. The device 100 can be made in different sizes and shapes to accommodate even smaller pets such as kittens, hamsters, or rats. Preferably, the device 100 is oval, tri-oval, elliptical, or other curved-shaped.

The interactive rollerball animal amusement device 100 of different embodiments is constructed using food-grade, eco-friendly plastic materials. The device 100 can be manufactured through various methods, including plastic injection molding, 3-D printing, or similar techniques for forming durable and precise plastic structures.

A description of an embodiment with several components in communication with each other does not imply that all such components are required. On the contrary, a variety of optional components are described to illustrate the wide variety of possible embodiments of the disclosure. Further, there are other components also present in the substation communication network, however, these are not presented in the description to focus on the main features of the invention.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An animal scratching pad and amusement device, comprising:
  a toy body having an open-topped continuous half-pipe track disposed around the periphery thereof;
  a ball movable around said track, wherein said ball is configured to roll freely within the track;
  a removable scratchpad attached to a recessed reception area, the recessed reception area is formed on a top surface of the toy body; a height insert block having a protrusion; and
  a flat bottom of the toy body having an attachment point therein, wherein said protrusion is attached into said attachment point and elevated only one edge of the toy body to incline the track and enhance the rolling motion of the ball.

2. The animal scratching pad and amusement device of claim 1, wherein said continuous half-pipe track is circular and surrounds said scratchpad and said receptacle.

3. The animal scratching pad and amusement device of claim 1, said extended height insert block includes a base providing stable support and prevents lateral movement of the device on a flat surface.

4. The animal scratching pad and amusement device of claim 3, wherein at least one attachment point on the bottom surface of the circular body includes one or more recesses adapted to receive a matching protrusion on the insert block.

5. The animal scratching pad and amusement device of claim 1, wherein the toy body is one of circular, oval, tri-oval, or elliptical.

6. The animal scratching pad and amusement device of claim 1, wherein the toy body is made of a food-grade and durable material.

7. The animal scratching pad and amusement device of claim 3, wherein the extended height insert block includes a convex curved edge making contact with the flat surface enabling the device to move back and forth laterally.

8. An animal scratching pad and amusement device, comprising:

a toy body having a diameter and an open-topped continuous half-pipe track disposed around the periphery thereof;
  a ball movable around said track, wherein said ball is configured to roll freely within the track;
  a removable scratchpad receivable in a recessed reception area, the recessed reception area being formed on the top surface of the toy body; and
  a rocking motion insert having a curved edge, the insert attaches to a bottom surface of said toy body, said insert to elevates only one edge of the toy body from a flat surface;
  wherein the curved edge rests on the flat surface and provides a rocking motion to enhance play experience of the ball in the track by creating side-to-side or to-and-fro movement of the toy body.

9. The animal scratching pad and amusement device of claim 8, wherein said rocking motion insert block includes one or more protrusions configured to engage with corresponding attachment points being recesses disposed on the bottom surface of the toy body.

10. The animal scratching pad and amusement device of claim 8, wherein the toy body is one of circular, oval, tri-oval, or elliptical.

11. The animal scratching pad and amusement device of claim 8, further comprising a slip-on bag configured to partially or fully enclose the toy body, wherein the slip-on bag includes an elastic opening or a drawstring for secure attachment.

12. The animal scratching pad and amusement device of claim 11, wherein the slip-on bag is made from a material selected from medium to heavy-gauge plastic, crinkle plastic with or without natural fibres, or eco-friendly fabrics such as cotton, jute, hemp, or burlap.

13. The animal scratching pad and amusement device of claim 8, wherein said ball is made from a material selected from resins, phenolic resins, polyester resins, plastic, or glass, providing sufficient mass to maintain inertia during motion.

14. An animal amusement device, comprising:
  a toy body made of a waterproof, food-grade durable material, said toy body having a continuous half-pipe track disposed around the periphery thereof;
  a recessed reception area formed on the top surface of the toy body, the recessed reception area being configured to receive and securely accommodate a removable scratchpad;
  a height adjustment or motion-enhancing insert, each including at least one protrusion; and a bottom surface of the toy bottom including attachment points for the at least one protrusion formed as recesses position near the periphery.

* * * * *